United States Patent
Fischerkeller et al.

(10) Patent No.: US 6,371,153 B1
(45) Date of Patent: Apr. 16, 2002

(54) DUAL FUEL DELIVERY MODULE SYSTEM FOR MULTI-CHAMBERED OR MULTIPLE AUTOMOTIVE FUEL TANKS

(75) Inventors: Rolf Fischerkeller, White Lake; Paul Wickett, Northville, both of MI (US)

(73) Assignee: Robert Bosch Corporation, Broadview, IL (US)

( * ) Notice: Subject to any disclaimer, the term of this patent is extended or adjusted under 35 U.S.C. 154(b) by 0 days.

(21) Appl. No.: 09/809,801

(22) Filed: Mar. 16, 2001

(51) Int. Cl.[7] ................................................ F02M 37/10
(52) U.S. Cl. ............. 137/265; 137/565.22; 137/565.33; 123/509; 123/514
(58) Field of Search ................................. 137/265, 574, 137/576, 565.22, 565.33; 123/509, 514

(56) References Cited

U.S. PATENT DOCUMENTS

| | | |
|---|---|---|
| 3,884,255 A | 5/1975 | Merkle |
| 4,683,864 A | 8/1987 | Bucci |
| 4,838,307 A | 6/1989 | Sasaki et al. |
| 4,860,714 A | 8/1989 | Bucci |
| 5,020,566 A | 6/1991 | Shoop |
| 5,078,169 A | 1/1992 | Scheurenbrand et al. |
| 5,163,466 A | 11/1992 | Moody |
| 5,197,444 A | 3/1993 | Lang et al. |
| 5,360,034 A | 11/1994 | Der Manuelian |
| 5,450,832 A | 9/1995 | Graf |
| 5,623,910 A | 4/1997 | Riggle |
| 5,647,328 A | 7/1997 | Fournier et al. |
| 5,647,329 A | 7/1997 | Bucci et al. |
| 5,732,684 A | 3/1998 | Thompson |
| 5,850,851 A | 12/1998 | Miura et al. |
| 5,875,816 A | 3/1999 | Frank et al. |
| 5,881,698 A | 3/1999 | Tuckey et al. |
| 5,896,846 A | 4/1999 | Bauer et al. |
| 5,983,932 A | 11/1999 | Wagner et al. |
| 6,283,142 B1 * | 9/2001 | Wheeler et al. ............ 137/265 |

FOREIGN PATENT DOCUMENTS

EP   0 979 939 A2   2/2000

* cited by examiner

*Primary Examiner*—John Rivell
(74) *Attorney, Agent, or Firm*—Michael Best & Friedrich LLP

(57) ABSTRACT

A fuel system including first and second tank portions, first and second fuel pumps in the first and second tank portions, respectively, a first crossover fuel line for transferring fuel from the second tank portion to the first tank portion, and a second crossover fuel line for transferring fuel from the first tank portion to the second tank portion. In one aspect of the invention the first and second tank portions define a bifurcated tank and the first and second crossover fuel lines are housed completely within the bifurcated tank. In another aspect of the invention, the first and second crossover fuel lines extend partially outside the bifurcated tank.

25 Claims, 2 Drawing Sheets

DUAL FUEL DELIVERY MODULE SYSTEM FOR MULTI-CHAMBERED OR MULTIPLE AUTOMOTIVE FUEL TANKS

FIELD OF THE INVENTION

The invention relates to fuel delivery systems for automobiles, and more specifically to fuel pump delivery systems for use with multi-chambered or multiple fuel tanks.

BACKGROUND OF THE INVENTION

The use of multi-chambered fuel tanks or multiple fuel tanks in a vehicle is known. For example, the use of a bifurcated fuel tank, also commonly referred to as a saddle tank, in conjunction with fuel delivery systems having a single fuel pump is known. In such systems, a reservoir surrounds the fuel pump and is constantly filled to insure that a steady supply of fuel is available to the pump at all times. Normally, fuel is drawn into the fuel pump from the bifurcated tank portion housing the fuel pump, but if the fuel level is low or vehicle maneuvering is such that the fuel pump inlet cannot draw fuel, the fuel pump instantly draws fuel from the reservoir. A jet pump is used to draw fuel through a crossover line from the opposing bifurcated portion of the tank and pump the fuel into the reservoir. The reservoir is usually overflowing and excess fuel fills the bifurcated tank portion housing the fuel pump. This insures that if fuel remains in either of the bifurcated tank portions, it is available to the fuel pump.

The reservoir, fuel pump, jet pump, and crossover line are typically packaged with additional components in a standard fuel pump module that can be quickly and easily installed in the tank as a single unit.

SUMMARY OF THE INVENTION

Today's high-performance and high-power automobiles require a higher rate of fuel flow to the engine than can often be provided with a single standard capacity fuel pump used with multiple fuel tanks or in a multi-chambered fuel tank. There are numerous ways to obtain the higher fuel flow capacity. One possibility is to replace the standard capacity fuel pump with a high performance, high capacity fuel pump. This modification is problematic in that a high capacity fuel pump is larger than a standard capacity fuel pump and will not fit properly in the reservoir of a standard fuel pump module. Using a larger fuel pump requires designing, manufacturing, and assembling new fuel pump module components, including a new reservoir, to accommodate the larger fuel pump. Modifications to the fuel tank may also be needed. The tooling and testing costs for such modifications are high.

Another possibility for obtaining the higher fuel flow capacity is to use two standard capacity fuel pumps in a single fuel pump module. This possibility would also require changing the fuel pump module components to accommodate the two standard capacity fuel pumps. Again, modifications to the tank may also be required.

The present invention overcomes the problems described above by incorporating two standard fuel pump modules for multiple tanks or in a multi-chambered tank. In the preferred embodiment, one standard fuel pump module is used in each portion of a bifurcated fuel tank to provide the necessary fuel delivery to the engine. The use of standard fuel pump modules substantially eliminates the costs associated with any new tooling and testing that would otherwise be required to modify the fuel pumping capacity of a single standard fuel pump module.

Using a standard fuel pump module in each portion of the bifurcated fuel tank presents some challenges not previously encountered when using a single fuel pump module in one side of the bifurcated tank. Since the engine demands fuel flow from both fuel pumps, it is important that both fuel pumps have access to a sufficient amount of fuel. Due to automobile maneuvering (wherein fuel sloshes over the bifurcating wall of the tank), partial tank filling, and variations in fuel pump flow capacities, the fuel levels in the bifurcated portions are often unequal. Using a fuel pump in each portion of the bifurcated fuel tank therefore mandates a method of insuring that fuel is available to both fuel pumps at all times.

In the present invention, the standard fuel pump modules are equipped with reservoirs and jet pumps that can compensate for the differences in the fuel levels of a bifurcated tank. Each jet pump has its own dedicated crossover fuel line that transfers fuel over the bifurcating wall. The first crossover fuel line communicates with the first jet pump and is dedicated to transferring fuel from the second bifurcated portion to the reservoir in the first bifurcated portion. The second crossover fuel line communicates with the second jet pump and is dedicated to transferring fuel from the first bifurcated portion to the reservoir in the second bifurcated portion.

At a minimum, each jet pump transfers fuel at a sufficient rate to insure that both fuel pumps can meet the fuel consumption demands of the engine. More preferably, each jet pump transfers fuel at a higher rate than is necessary to fulfill the demand on the fuel pumps. Therefore, both jet pumps and crossover lines, working independently of one another, help to equalize the fuel level in the bifurcated portions of the tank as the tank empties, thereby insuring that both fuel pumps have sufficient access to fuel. While described in conjunction with bifurcated fuel tanks, the present invention could also be used with other types of multi-chambered tanks or with multiple fuel tanks.

The dual fuel pump module system of the present invention is an alternative to the system described in co-pending U.S. patent application Ser. No. 09/498,313. In that application, a single crossover fuel line communicates with both jet pumps. Shuttle valves control the direction of fuel flow through the single crossover line to maintain substantially equal fuel levels in both bifurcated portions until the tank is empty. Should one bifurcated portion empty before the other, both jet pumps draw fuel from the bifurcated portion with the remaining fuel, thereby insuring that both fuel pumps continue to provide fuel to the engine until both bifurcated portions are substantially empty.

The dual fuel pump module system of the present invention provides a reliable, alternative method of delivering fuel from both tank portions of a bifurcated fuel tank to the engine. The present invention allows for the use of standard components and fuel tank platforms in fuel systems having higher fuel demands.

Other features and advantages of the invention will become apparent to those skilled in the art upon review of the following detailed description, claims, and drawings.

Figure 1:
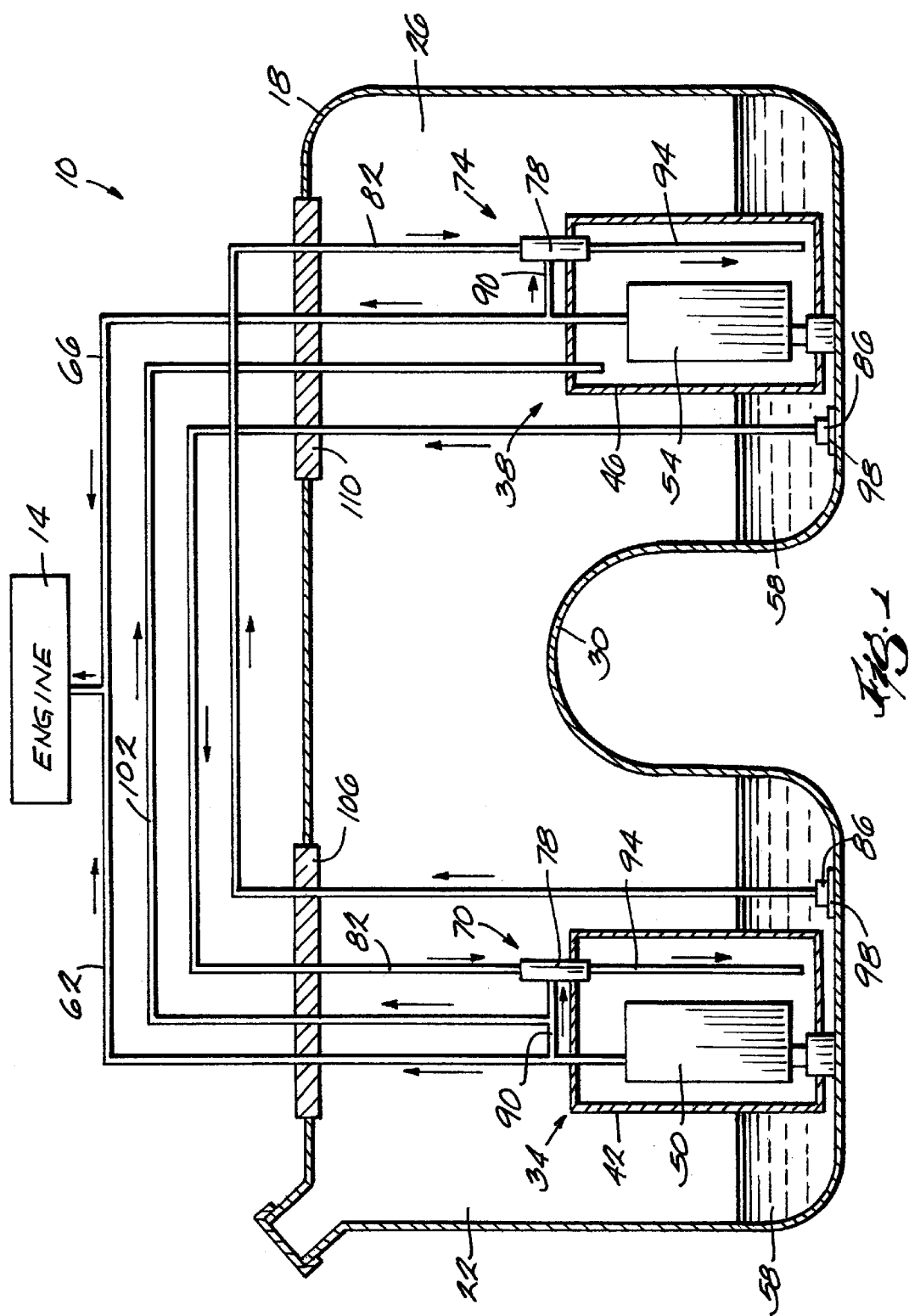
FIG. 1 is a partial section view of a dual fuel pump delivery system embodying the invention.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items.

DETAILED DESCRIPTION OF THE PREFERRED EMBODIMENT

FIG. 1 illustrates a fuel system 10 embodying the present invention. The fuel system 10 is for use in conjunction with an internal combustion engine 14 that requires a relatively high rate of fuel flow (i.e., a supercharged engine). A bifurcated fuel tank 18 has a first tank portion 22 and a second tank portion 26. This type of bifurcated fuel tank is commonly known as a saddle tank due to its saddle-like shape. A wall or hump 30 partially separates the first and second tank portions 22 and 26, but allows the tank 18 to maintain a single vapor pressure throughout. The tank 18 need not be bifurcated in the fashion illustrated, but could be bifurcated in any other way. Additionally, the tank 18 could include more tank portions. Furthermore, the first and second tank portions 22, 26 could be completely separate tanks instead of being portions of a single multichambered tank.

The tank portions 22, 26 house respective first and second fuel pump modules 34, 38 which are substantially the same. The fuel pump modules 34, 38 include respective first and second reservoirs 42, 46, that are at least partially open at the top, and first and second fuel pumps 50, 54 inside the respective reservoirs 42, 46. The fuel pumps 50, 54 are shown as being located inside the reservoirs 42, 46, but the fuel pumps 50, 54 could also be located outside the reservoirs 42, 46. The fuel pumps 50, 54 supply fuel 58 to the engine 14 via a first fuel supply line 62 and a second fuel supply line 66, respectively.

The fuel pumps 50, 54 are substantially identical and can draw fuel directly from the respective bifurcated tank portions 22, 26 or from the respective reservoirs 42, 46 as is well known in the art. When there is sufficient fuel 58 in the tank portions 22, 26, the pumps 50, 54 draw fuel from the respective tank portions 22, 26. When there is an insufficient amount of fuel 58 in the tank portions 22, 26 or the fuel 58 is not available at the pump inlets (not shown) due to vehicle maneuvering, the pumps 50, 54 draw fuel from the respective reservoirs 42, 46. This insures that the fuel pumps 50, 54 always have an available supply of fuel 58 during periods of low fuel levels and high vehicle maneuvering.

Since the engine 14 requires fuel flow from both fuel pumps 50, 54, an interruption in the fuel flow from either fuel pump 50, 54 could damage the engine 14 and catalytic converter (not shown) and should be avoided. Furthermore, the fuel pumps 50, 54 may also be damaged if operated without fuel 58 for a nominal period of time. To prevent such damage, fuel 58 is constantly supplied to the reservoirs 42, 46 as will be described below. The constant supply of fuel 58 means the reservoirs 50, 54 are substantially always full and overflowing into the respective tank portions 22, 26 during normal operation.

First and second fuel transfer units 70, 74 are located in respective tank portions 22, 26 adjacent the respective fuel delivery modules 34, 38, and transfer fuel from the tank portions 22, 26 into the respective reservoirs 42, 46. The fuel transfer units 70, 74 are substantially identical and common elements have been given the same reference numerals. Only the fuel transfer unit 74 will be described in detail.

The fuel transfer unit 74 includes a jet pump 78, a crossover line 82, and a suction port 86. The jet pump 78 works in a known manner using the Venturi effect and is shown mounted to the reservoir 46. Of course, the jet pump 78 need not be mounted to the reservoir 46 as shown. The jet pump 78 receives high pressure fuel 58 that is diverted from the fuel supply line 66 via a jet pump supply line 90. Alternatively fuel may be supplied to the jet pump 78 from a regulated return line (not shown) returning fuel to the tank 18.

The high pressure fuel is converted to high velocity fuel, as is commonly understood. The high velocity fuel 58 exits the jet pump 78 through an outlet line 94 that communicates with the reservoir 46. Preferably, the outlet line 94 communicates with the reservoir 46 such that fuel 58 enters the filled reservoir 46 below the fuel surface level so as not to splash and cause vapor pressure build-up. The Venturi effect in the jet pump 78 creates a low pressure area that generates suction in the crossover line 82, causing fuel 58 to enter the suction line 82 at the suction port 86 located in the bifurcated tank portion 22. The suction port 86 preferably includes a filter 98 for filtering the fuel 58 before the fuel 58 enters the crossover line 82. Any suitable filter 98 can be used, including, for example, a plastic screen having apertures ranging in diameter from approximately 2–3 mm.

The fuel 58 is then transferred through the suction line 82, over the hump 30, and into the bifurcated tank portion 26 where it exits the jet pump 78 through the outlet line 94 and into the reservoir 46. The jet pump 78 operates in this manner as long as high pressure fuel 58 is supplied via the supply line 90. The jet pump 78 preferably draws fuel 58 from the first tank portion 22 at a faster rate than the fuel pump 54 pumps the fuel 58 out of the tank 14. This insures that if there is fuel 58 remaining in the first tank portion 22, the fuel pump 54 will have an ample supply of fuel 58 to meet the demands of the engine 14.

The fuel transfer units 70, 74 operate independently of one another to continuously transfer fuel between the tank portions 22, 26. More specifically, the fuel transfer unit 74 draws fuel from the tank portion 22 and deposits the fuel 58 into the reservoir 46 as previously described. The fuel transfer unit 70 draws fuel from the tank portion 26 and deposits the fuel 58 into the reservoir 42 in the same manner as described above with respect to the fuel transfer unit 74. The fuel transfer units 70, 74 simultaneously draw fuel 58 from the tank portions 22, 26 and deposit fuel 58 in the opposing tank portions 22, 26. This constant and simultaneous fuel transferring insures that both fuel pumps 50, 54 have a constant supply of fuel 58 until the tank 18 is emptied.

The fuel system 10 also includes a priming line 102 that delivers a small amount of fuel 58 to the reservoir 46 after partial filling of the tank 18. The priming line 102 supplies fuel 58 to the fuel pump 54 such that the fuel transfer unit 74 can be started in the absence of fuel 58 in the tank portion 26.

As seen in FIG. 1, the fuel crossover lines 82 and the priming line 102 can be routed outside of the fuel tank 18 between the respective bifurcated tank portions 22, 26. Routing the crossover lines 82 and the priming line 102 in the manner illustrated in FIG. 1 facilitates the assembly of the fuel system 10 by enabling the assembler to work with the crossover lines 82 and the priming line 102 outside of the tank 18. The crossover lines 82 and the priming line 102 enter and exit the tank 18 through connection ports (not shown) in first and second closure flanges 106, 110. The connection ports enable quick and easy assembly of the crossover lines 82 and the priming line 102.

Figure 2:
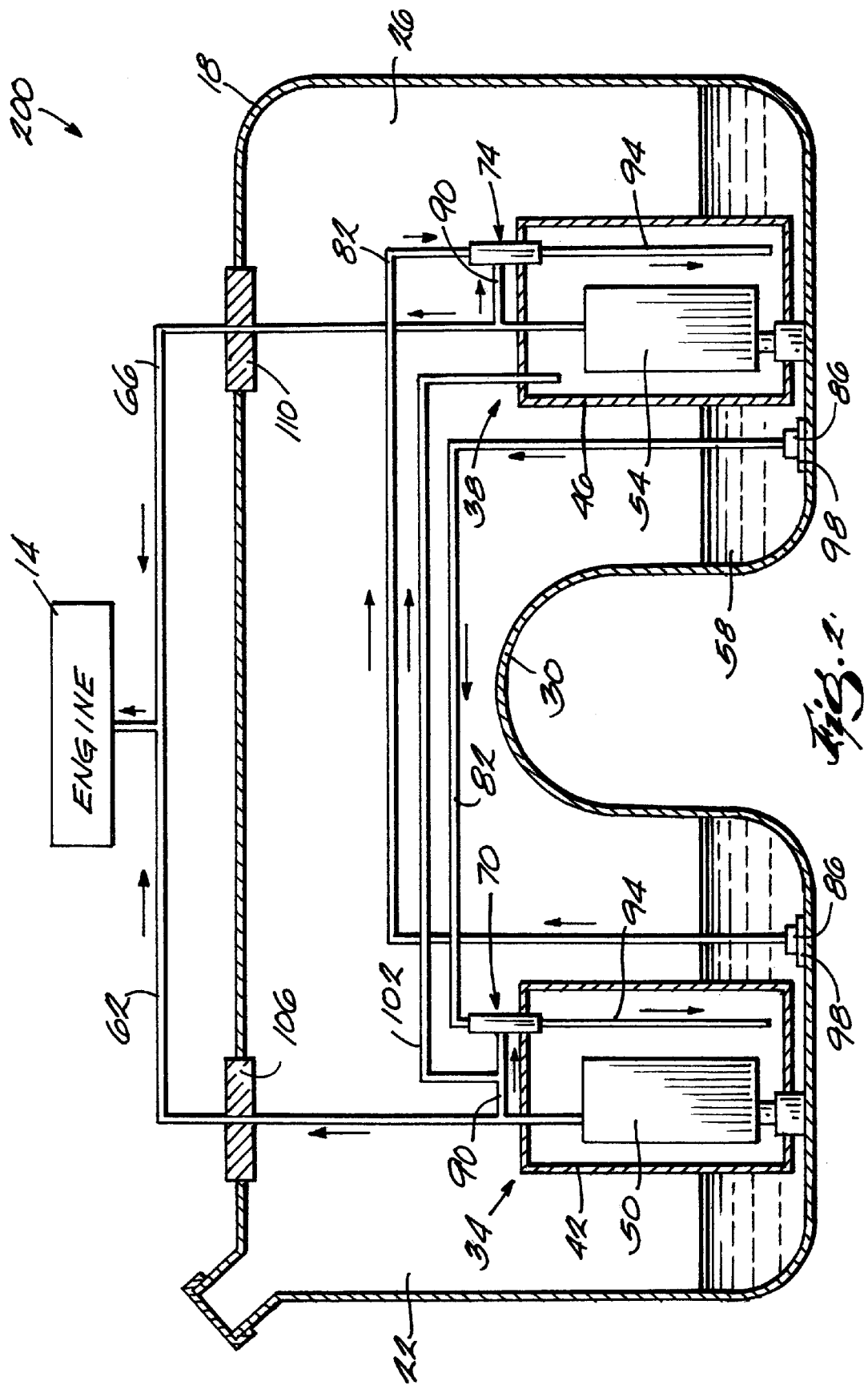
FIG. 2 is a partial section view of another dual fuel pump delivery system embodying the invention.

FIG. 2 shows a fuel system 200 that is an alternative embodiment of the present invention. Like parts are given like reference numerals. The fuel system 200 is substantially identical to the fuel system 10 except that the crossover lines 82 and the priming line 102 are housed completely within the tank 18. While the fuel system 200 can be slightly more difficult to assemble than the fuel system 10, the fuel system 200 will be less expensive since no extra connectors or modifications are required at the closure flanges 106, 110. Additionally, by keeping the crossover lines 82 and the priming line 102 completely within the tank 18, the fuel system 200 has lower emissions than the fuel system 10.

Various features of the invention are set forth in the following claims.

What is claimed is:

1. A fuel system comprising:
    first and second tank portions;
    first and second fuel pumps in the first and second tank portions, respectively;
    a first crossover fuel line for transferring fuel from the second tank portion to the first tank portion;
    a second crossover fuel line for transferring fuel from the first tank portion to the second tank portion;
    a first jet pump in the first tank portion communicating with the first crossover fuel line for pulling fuel through the first crossover fuel line; and
    a second jet pump in the second tank portion communicating with the second crossover fuel line for pulling fuel through the second crossover fuel line.

2. The fuel system of claim 1, wherein the first and second tank portions define a bifurcated tank.

3. The fuel system of claim 2, wherein the first and second crossover fuel lines are housed completely within the bifurcated tank.

4. The fuel system of claim 2, wherein the first and second crossover fuel lines extend partially outside the bifurcated tank.

5. The fuel system of claim 1, further comprising:
    a priming line communicating between the first and second tank portions independently of the first and second fuel crossover lines to transfer fuel between the first and second tank portions when one of the first and second tank portions has been emptied.

6. The fuel system of claim 1, further comprising:
    a first fuel reservoir in the first tank portion from which the first fuel pump can draw fuel; and
    a second fuel reservoir in the second tank portion from which the second fuel pump can draw fuel.

7. The fuel system of claim 6, wherein the first and second jet pumps include respective first and second outlets communicating with the first and second reservoirs, respectively.

8. The fuel system of claim 1, further comprising:
    a first suction port in the second tank portion, the first suction port communicating with the first crossover fuel line; and
    a second suction port in the first tank portion, the second suction port communicating with the second crossover fuel line.

9. The fuel system of claim 8, wherein the first and second suction ports include first and second filters, respectively, for filtering fuel entering the first and second crossover fuel lines.

10. A fuel system comprising:
    first and second tank portions;
    a first fuel reservoir in the first tank portion;
    a second fuel reservoir in the second tank portion;
    first and second fuel pumps in the first and second tank portions, respectively, the first fuel pump drawing fuel from one of the first tank portion and the first reservoir and the second fuel pump drawing fuel from one of the second tank portion and the second reservoir;
    a first crossover fuel line for transferring fuel from the second tank portion to the first tank portion;
    a second crossover fuel line for transferring fuel from the first tank portion to the second tank portion;
    a first jet pump in the first tank portion communicating with the first crossover fuel line for pulling fuel through the first crossover fuel line, the first jet pump having an outlet communicating with the first reservoir; and
    a second jet pump in the second tank portion communicating with the second crossover fuel line for pulling fuel through the second crossover fuel line, the second jet pump having an outlet communicating with the second reservoir.

11. The fuel system of claim 10, further comprising:
    a first suction port in the second tank portion, the first suction port communicating with the first crossover fuel line; and
    a second suction port in the first tank portion, the second suction port communicating with the second crossover fuel line.

12. The fuel system of claim 10, further comprising:
    a priming line for delivering fuel to the second fuel pump after partial filling of the first tank portion.

13. The fuel system of claim 10, wherein the first and second tank portions define a bifurcated tank.

14. The fuel system of claim 13, wherein the first and second crossover fuel lines are housed completely within the bifurcated tank.

15. The fuel system of claim 13, wherein the first and second crossover fuel lines extend partially outside the bifurcated tank.

16. A method of delivering fuel to an engine from a fuel tank having a first fuel pump module in a first tank portion and a second fuel pump module in a second tank portion, the first fuel pump module including a first fuel pump, a first jet pump, and a first crossover fuel line communicating between the second tank portion and the first tank portion, and the second fuel pump module including a second fuel pump, a second jet pump, and a second crossover fuel line communicating between the first tank portion and the second tank portion, the method comprising:
    transferring fuel from the second tank portion to the first tank portion through the first crossover fuel line in response to suction generated by only the first jet pump;
    pumping fuel from the first tank portion to the engine with the first fuel pump;
    transferring fuel from the first tank portion to the second tank portion through the second crossover fuel line in response to suction generated by only the second jet pump; and
    pumping fuel from the second tank portion to the engine with the second fuel pump.

17. The method of claim 16, wherein all of the pumping and transferring steps occur substantially simultaneously.

18. The method of claim 16, wherein each of the pumping and transferring steps occur substantially continuously during operation of the engine.

19. The method of claim 16, wherein the transferring steps include filtering the fuel as the fuel enters the first and second crossover fuel lines.

20. The method of claim 16, wherein the transferring steps include routing the fuel out of the tank and back into the tank.

21. A fuel system comprising:
   a first fuel pump module having a fuel pump, a jet pump, and a crossover fuel line;
   a second fuel pump module having a fuel pump, a jet pump, and a crossover fuel line; and
   a priming line communicating between the first and second fuel pump modules independently of the crossover lines to transfer fuel between the first and second fuel pump modules.

22. The fuel system of claim 21, wherein the jet pump of the first fuel pump module does not communicate with the crossover line of the second fuel pump module, and wherein the jet pump of the second fuel pump module does not communicate with the crossover line of the first fuel pump module.

23. The fuel system of claim 21, wherein there is no fluid communication between the crossover line of the first fuel pump module and the crossover line of the second fuel pump module.

24. The fuel system of claim 21, wherein the fuel pump modules are operable independently of one another.

25. The fuel system of claim 21, wherein the jet pump of the first fuel pump module is powered only by the fuel pump of the first fuel pump module, and wherein the jet pump of the second fuel pump module is powered only by the fuel pump of the second fuel pump module.

* * * * *